(12) United States Patent
Sugimoto

(10) Patent No.: US 7,764,352 B2
(45) Date of Patent: Jul. 27, 2010

(54) LIQUID CRYSTAL DISPLAY DEVICE AND METHOD OF MANUFACTURING THE SAME

(75) Inventor: Mitsuhiro Sugimoto, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 404 days.

(21) Appl. No.: 11/581,395

(22) Filed: Oct. 17, 2006

(65) Prior Publication Data
US 2007/0091246 A1   Apr. 26, 2007

(30) Foreign Application Priority Data
Oct. 24, 2005   (JP) ............................. 2005-308849

(51) Int. Cl.
*G02F 1/1339* (2006.01)
(52) U.S. Cl. ...................................... 349/153
(58) Field of Classification Search ....................... None
See application file for complete search history.

(56) References Cited

U.S. PATENT DOCUMENTS

| | | | | |
|---|---|---|---|---|
| 6,392,735 | B1* | 5/2002 | Tani | 349/156 |
| 2006/0146265 | A1* | 7/2006 | Park | 349/153 |
| 2006/0170854 | A1* | 8/2006 | Han et al. | 349/153 |
| 2007/0211197 | A1* | 9/2007 | Tashiro et al. | 349/106 |
| 2008/0151172 | A1* | 6/2008 | Kondo et al. | 349/153 |

FOREIGN PATENT DOCUMENTS

JP   3381785   12/2002

* cited by examiner

*Primary Examiner*—Sung H Pak
(74) *Attorney, Agent, or Firm*—Young & Thompson

(57) ABSTRACT

An LCD device is obtained by joining a counter substrate and a TFT substrate with a sealing member having at least a UV-curable characteristic. The sealing member includes a UV-curable resin and high-refractive layers formed respectively on the surfaces of spacers which are dispersed in the UV-curable resin, each of the surfaces of the spacers having a refractive index higher than that of the UV-curable resin.

29 Claims, 6 Drawing Sheets

LIQUID CRYSTAL DISPLAY DEVICE AND METHOD OF MANUFACTURING THE SAME

BACKGROUND OF THE INVENTION

1. Field of the Invention

The present invention relates to a liquid crystal display (LCD) device and a method of manufacturing the LCD device, and particularly to the LCD device having an ultraviolet-curable (UV-curable) sealing member.

2. Description of the Related Art

It has been required to reduce manufacturing cost of LCD devices used as TV monitors and OA monitors. Productivity of LCD panels has been increased because of the following reasons in a process of manufacturing the LCD panel: reduction in tact time; reduction in the number of steps resulting from introduction of a new process; and increase in size of a mother glass substrate used in manufacturing the LCD panel. A so-called one-drop-fill (ODF) process has been adopted as a specific measure to shorten a liquid-crystal-injecting step in a cell manufacturing step in which two panels are assembled. In the ODF process, liquid crystals are previously dropped to the surface of any one of a thin film transistor substrate (TFT substrate) and a counter substrate, and then the two substrates are joined to each other in a vacuum.

In the ODF process, at least a UV-curable sealing member is used to join the TFT substrate and the counter substrate. Since the sealing member is in contact with a liquid crystal material in the ODF process in a state of not being cured, the sealing member needs to have no compatibility with the liquid crystal material. In addition, a light-curable reaction in the sealing member needs to be sufficiently accelerated when a UV light irradiation process is performed on the sealing member, because the following occur when the curing process of the sealing member is not sufficient. Unreacted components having lower molecular weight in the sealing member dissolve into the liquid crystal material so that visible defects or display unevenness occurs over time, and thus display quality is significantly decreased.

Meanwhile, in the ODF process, it is also necessary to keep the radiation intensity lower, for instance, by shortening the time period for UV light irradiation or performing masking to inhibit UV light from being directly irradiated on portions excluding portions to be irradiated on and the periphery thereof. Specifically, it is necessary to prevent organic members (a liquid crystal material, alignment films and a color filter material) except the sealing member from being deteriorated with light and being dissolved when the curing process is performed to the sealing member by UV irradiation. The prevention is necessary because deterioration of the image quality of the LCD directly results from the change in composition of the liquid crystal material and the alignment films, the change being caused since the liquid crystal material and the alignment films are deteriorated with light and dissolved. Even if display regions are masked during the curing process is performed to the sealing member, UV light partly reflects and scatters in the substrate, and thus cannot be prevented from reaching the display regions. For the reasons, an essential problem is how efficiently UV light is irradiated on a sealing member in the process of curing the sealing member with UV light.

In order to solve the problem, the following LCD device has been proposed. In the LCD device, a counter substrate and a TFT substrate are joined to each other with a UV-curable sealing member mixed with spacers. The LCD device has a configuration in which a reflective layer for UV light source is provided near a main seal pattern on the substrate facing the substrate on which UV light is made incident. The provision is aimed at efficiently and evenly perform the curing process to the main seal with UV light.

However, the related art described above includes a problem that the provision of the reflective layer for reflecting UV light increases the manufacturing cost. In addition, another problem is included that a metal film having a higher reflectance generally has a lower resistance value, and accordingly the types of a film used as the reflective layer is limited depending on the mode in which the liquid crystals are driven. Another problem is also included that the reflective layer of the related art does not ensure efficient use of UV light because the reflective layer does not repeatedly reflects UV light.

SUMMARY OF THE INVENTION

Therefore, an exemplary feature of the invention is realized in consideration of the problems described above, and is to provide an LCD device and a method of manufacturing the device in both of which curing reaction in a UV-curable sealing member can be sufficiently accelerated and thus the UV-curable sealing member is cured without a reflective layer.

The liquid crystal display device of the invention includes: a pair of substrates between which liquid crystals are sandwiched; an ultraviolet-curable sealing member for joining the pair of substrates to each other, the sealing member being obtained by dispersing, in an ultraviolet-curable resin, high-refractive members each having a refractive index higher than that of the ultraviolet-curable resin; and spacers mixed into the sealing member.

It is preferable that the high-refractive members are high-refractive layers respectively formed on the surfaces of the spacers.

It is preferable that the high-refractive members are made of any one of DLC (diamond-like carbon), zirconia, titanium oxide and alumina.

It is preferable that each of the high-refractive members has a refractive index of not less than 1.7.

It is preferable that each of the high-refractive members has a refractive index of not less than 2.1.

It is preferable that each of the high-refractive members has a stacked structure of layers which are formed on the surface of each of the spacers, and the outermost layer thereof is a high-refractive layer whose refractive index is higher than that of the ultraviolet-curable resin.

It is preferable that each of the high-refractive members has a stacked structure of high-refractive layers which are formed on the surface of each of the spacers, and a refractive index of the outermost layer is higher than that of any other layer in the stacked structure of high-refractive layers.

It is preferable that the high-refractive members are high-refractive fillers dispersed in the ultraviolet-curable resin.

It is preferable that the high-refractive members are high-refractive fillers, which are dispersed in the ultraviolet-curable resin, each of the high-refractive fillers having a stacked structure of layers, and the outermost layer of each of the fillers having a refractive index higher than that of the ultraviolet-curable resin.

It is preferable that the high-refractive members are high-refractive fillers, which are dispersed in the ultraviolet-curable resin, each of the high-refractive fillers having a stacked structure of layers, and a refractive index of the outermost layer being higher than that of any other layer in the stacked structure of layers.

Another liquid crystal display device includes: a pair of substrates between which liquid crystals are sandwiched; an ultraviolet-curable sealing member for joining the pair of substrates, the ultraviolet-curable sealing member being obtained by dispersing, in an ultraviolet-curable resin, high-relative-permittivity members each having a relative permittivity higher than that of the ultraviolet-curable resin; and spacers mixed into the sealing member.

It is preferable that the high-relative-permittivity members are high-relative-permittivity fillers dispersed in the UV-curable resin.

It is preferable that the high-relative-permittivity members are high-relative-permittivity layers respectively formed on the surfaces of the spacers.

A method of manufacturing a liquid crystal display device of the invention includes the steps of: preparing an ultraviolet-curable sealing member by mixing spacers and high-refractive members into an ultraviolet-curable resin, each of the high-refractive members having a refractive index higher than that of the ultraviolet-curable resin; joining a pair of substrates to each other with the sealing member interposed in between; and curing the sealing member with ultraviolet rays.

It is preferable that the high-refractive members are high-refractive layers respectively formed on the surfaces of the spacers.

It is preferable that the high-refractive members are made of any one of DLC (diamond-like carbon), zirconia, titanium oxide or alumina.

It is preferable that each of the high-refractive members has a refractive index of not less than 1.7.

It is preferable that each of the high-refractive members has a refractive index of not less than 2.1.

It is preferable that each of the high-refractive members has a stacked structure of layers which are formed on the surface of each of the spacers, and the outermost layer thereof is a high-refractive layer whose refractive index is higher than that of the ultraviolet-curable resin.

It is preferable that each of the high-refractive members has a stacked structure of high-refractive layers which are formed on the surface of each of the spacers, and a refractive index of the outermost layer is higher than any other layer in the stacked structure of high-refractive layers.

It is preferable that the high-refractive members are high-refractive fillers.

It is preferable that the high-refractive members are high-refractive fillers each of which has a stacked structure of layers, and the outermost layer of each of the fillers has a refractive index higher than that of the ultraviolet-curable resin.

It is preferable that the high-refractive members are high-refractive fillers each of which has a stacked structure of layers, and a refractive index of the outermost layer is higher than that of any other layer in the stacked structure of layers.

In the invention, when the sealing member for joining the pair of substrates to each other is cured with ultraviolet rays, ultraviolet rays made incident on the sealing member are partly reflected on the interfaces of the UV-curable resin and the members having a refractive index larger than that of the UV-curable resin. Thereafter, the UV rays become reflected rays and dispersed. The reflected rays and the UV rays made incident on the sealing member permeate the sealing member.

Therefore, according to the liquid crystal display device of the invention, the UV-curable sealing member mixed with the spacers includes the UV-curable resin and the high-refractive members which are dispersed in the UV-curable resin, and each of which has a refractive index higher than that of the UV-curable resin. Hence, the manufactured liquid crystal device of the invention does not include the reflection layer of the related art, and thus the manufacturing cost does not increase. Furthermore, the problem is not caused that light from the outside is reflected by the reflection layer. In addition, the device is not limited due to a drive mode of liquid crystals since the reflection layer is not provided. For this reason, the invention can be applied to a liquid crystal display device in an in-plane switching (IPS) mode to realize a liquid crystal display device at lower cost and with higher quality.

In addition, the followings are carried out in the method of manufacturing a liquid crystal display device of the invention. First, a UV-curable sealing member is prepared by mixing a UV-curable resin with spacers and high-refractive members each having a refractive index higher than that of the UV-curable resin. Thereafter, a pair of substrates are joined to each other with the sealing member interposed in between, and then the sealing member is cured with ultraviolet rays. This method accelerates the curing reaction of the UV-curable sealing member, thereby realizing the liquid crystal display device having a higher quality without visible defect and display unevenness. In addition, without provision of the reflection layer as a base of the sealing member, it is possible to realize the liquid crystal display device having a higher quality without visible defect and display unevenness.

BRIEF DESCRIPTION OF THE DRAWINGS

These and other objects and advantages and further description of the invention will be more apparent to those skilled in the art by reference to the description, taken in connection with the accompanying drawings, in which.

DETAILED DESCRIPTION OF THE PREFERRED EMBODIMENTS

Figure 6:
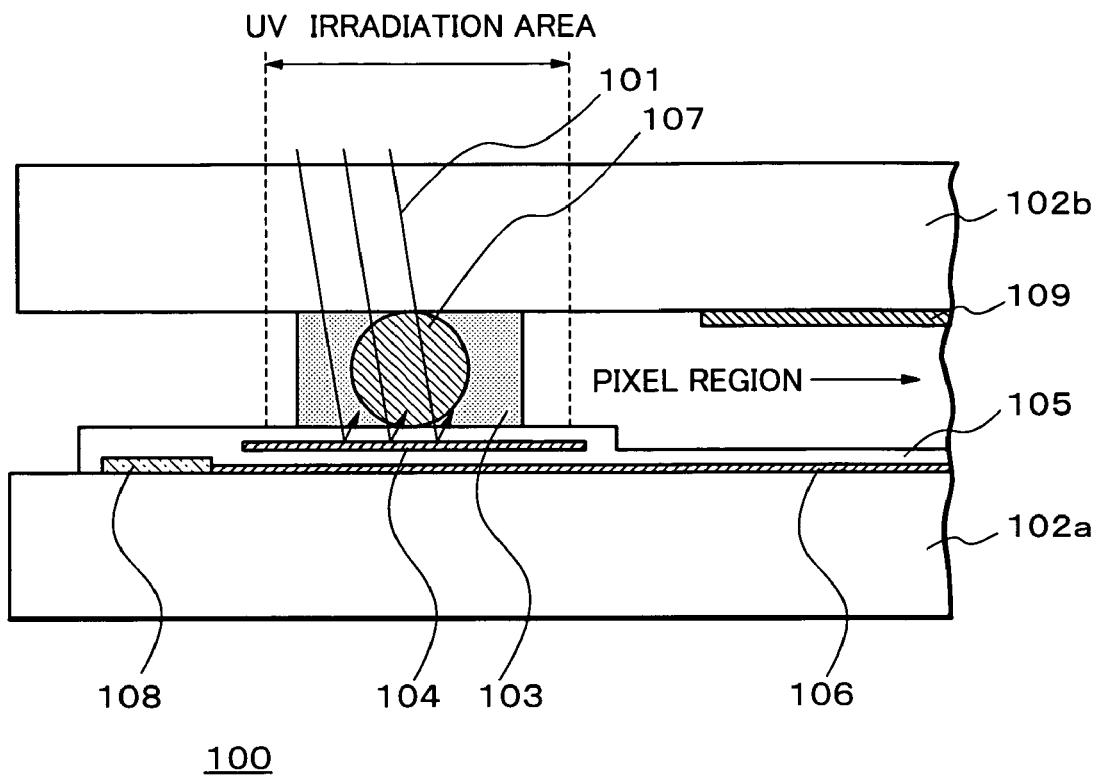
FIG. 6 is a partial cross sectional view for describing an LCD device of the related art.

Prior to descriptions for embodiments of the invention, the related art will be described by referring to the drawings. As shown in FIG. 6, provided on a TFT substrate 102a are driver circuits 108, wirings 106 for driving TFT switching elements, a reflective layer 104 and an insulating film 105. The wirings 106 for driving TFT switching elements are formed so that the wirings 106 extend from the driver circuit 108 to a pixel region (in a direction indicated by the arrow in FIG. 6) along a UV-curable sealing member 103 (seal pattern) in which spacers 107 are dispersed. The reflective layer 104 is formed along a pattern of the UV-curable sealing member 103 above the wirings 106. The insulating film 105 protects the wirings 106 and the reflective layer 104. Since the LCD device 100 of the related art includes the reflective layer 104, which reflects UV light, at the side of the TFT substrate 102a, irradiation of UV light is performed from the side of a counter substrate 102b to cure the seal pattern. As shown in FIG. 6, UV rays 101 are selectively irradiated on a region narrower than the width of the reflective layer 104 and wider than the width of the seal pattern of the UV-curable sealing member 103, the region excluding a light shielding layer 109 of the counter substrate 102*b*. Accordingly, it is possible to inhibit damage on organic matters such as a material of alignment films in the pixel region, and to efficiently cure the sealing member because the reflective layer 104 reflects the UV light. It suffices that the reflective layer for reflecting the UV light is made of a material having a substantial effect of reflecting the UV light, such as aluminum, chromium or tungsten silicide, and it is not necessary to form an optical thin multi-layered film for reflecting only light of a specific wavelength band. The related art described above has been proposed by Japanese Patent No. 3,381,785.

However, the related art has the following problems. The first one is that the provision of the reflective layer reflecting UV light increases the manufacturing cost. The following occurs in a crystal display device which is used as an OA, monitor, a TV monitor or the like, and which includes a reflective layer in a position which a user directly sees. Due to the reflective layer, light from the outside is reflected and projected to the panel under the normal environment. In order to solve the problem, for instance, a double-layered structure is adopted in the case where the reflective layer is formed of chrome. The double-layered structure is obtained by providing an unreflective chromium oxide film on a substrate first, and then forming a chrome film serving as a reflective film on the chromium oxide film. However, as described, increase in manufacturing cost cannot be avoided in the process for forming a plurality of films. Recently, for the purpose of reducing manufacturing cost, a black matrix layer of a counter substrate generally is shifting from the double-layered structure, which is realized by use of a chromium oxide film and a chrome film, to a single layer structure realized by use of only a chromium oxide film. Alternatively, the black matrix layer characteristically made of a material not reflecting light, such as resin in which carbon black is dispersed.

The second problem is that the types of the reflective layer are limited depending on the mode in which liquid crystals are driven. In the IPS mode of the LCD device used as an OA monitor, a TV monitor or the like, in which image quality is excellent, electric fields horizontal to the display surface are controlled. It is necessary to keep the resistance value of the counter substrate higher in order to have the directions of the electric fields utmost even in the thickness direction of the substrate. In general, a metal film having a higher reflectance cannot be used because such metal film has a lower resistance value.

The third problem is that UV light is not necessarily completely efficiently used. The more reflected on a reflective layer, the more UV light can be efficiently used. However, in the LCD device of the related art, UV light is not repeatedly reflected, and thus UV light is not necessarily efficiently used to a larger extent. Especially, the smaller the cell gap between a TFT substrate and a counter substrate is when the substrates are joined to each other, the more the ratio of the uncured film is increased. Accordingly, concern arises that the display quality deteriorates.

Subsequently, by referring to the drawings, detailed descriptions will be provided for exemplary embodiments of the invention.

Before specific descriptions will be provided for the embodiments, a basic principle of the invention will be described. A sealing member adopted for the ODF process is usually cured by UV light irradiation or by UV light irradiation and heat. At a stage in the ODF process before UV light is irradiated on the sealing member, in which the substrates are joined to each other, the sealing member includes at least a base resin, oligomer showing binding reaction with UV light or heat, fillers for adjusting viscosity and spreadability of the sealing member, and spacers for adjusting the cell gap. As a material of the base resin, epoxy or acrylic material is used which has a reflective index of approximately 1.5. As a material of oligomer, acrylic material, epoxy material or acrylic modified epoxy material is used which has a reflective index of approximately 1.5 to 1.6. As a material of the fillers, in most cases, silica is used which has a reflective index of approximately 1.4. As the spacers, inorganic matter such as silica or resin such as polystyrene, melamine, urea or benzoguanamine is used which is considered to have a reflective index of approximately 1.5 to 1.6. In other words, each of the components of the conventional sealing member has substantially the same reflective index of 1.4 to 1.6, and thus the sealing member does not easily cause optical reflection and refraction.

In order to cause UV rays to be absorbed into the sealing member sufficiently enough, it suffices that the sealing member has a configuration with which UV rays are repeatedly reflected inside the sealing member. In addition, it is effective to cause the components to have respectively different reflective indices at the interfaces. Specifically, a method can be adopted in which each of the spacers and the fillers has a refractive index higher than that of the base resin of the sealing member. It suffices that portions of the spacers or the fillers each having a higher refractive index are realized in the interfaces between the portions and the base resin. The portions can also be realized in a form of fillers or spacers obtained by coating the outer periphery of a core material with a material having higher refractive index (hereinafter referred to as high-refractive material) and a smaller thickness. Used as a high-refractive material is, for instance, DLC (with a reflective index of approximately 2.3 to 2.4), zirconia (with a refractive index of approximately 2.1), titanium oxide (with a refractive index of approximately 2.4) or alumina (with a refractive index of approximately 1.7). It can be considered that the outer periphery of each of the spacers or the fillers is coated with multiple layers of a material having a reflective index different from that of each of the spacers or the fillers.

When n1 and n2 denote respectively refractive indices of media 1 and 2, and R denotes a reflective index of light made incident vertically from the medium 1 to the medium 2, the relationship thereof can be shown as follows.

$$R=(n1-n2)^2/(n1+n2)^2$$

For instance, when n1 and n2 are respectively 1.5 and 2.4, the reflective index R is approximately 5.3%. When n1 and n2 are respectively 1.5 and 2.0, the reflective index R is approximately 2.0%. When n1 and n2 are respectively 1.5 and 1.8, the reflective index R is approximately 0.8%.

In addition, regarding a refractive index of a material, when n, $\epsilon r$ and $\mu r$ denote respectively a refractive index, a relative permittivity and a relative permeability from the viewpoint of the electromagnetics, the relationship thereof can be shown as follows.

$$n=\sqrt{(\epsilon r \times \mu r)}$$

It can be considered, from the viewpoint of the electromagnetics, that the relative permeability $\mu r$ is approximately 1 in a case of a higher frequency band of light vibrations of UV light or visible light. Thus, it can be said that the high-refractive material used for the invention is equivalent to a material with a higher relative permittivity $\epsilon r$. In other words, the spacers and the fillers used for the invention can have characteristics with which the sealing member is cured as in the case of the high-refractive material, by selecting materials each having a higher refractive index (hereinafter referred to as a high-permittivity material) as the spacers and the fillers.

First Embodiment

Figure 1:
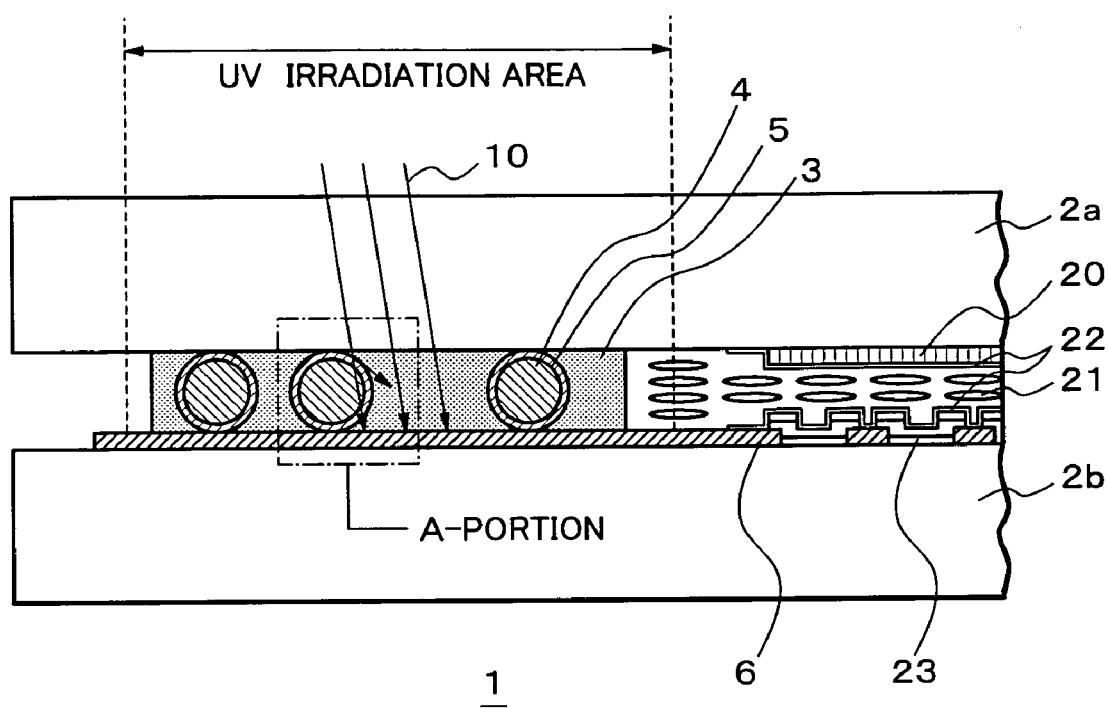
FIG. 1 is a partial cross-sectional view for describing an LCD device of a first exemplary embodiment of the invention.

As illustrated in FIG. 1, in an LCD device 1 of a first exemplary embodiment, a TFT substrate 2a and a counter substrate 2b, which are an example of a pair of substrates, are joined to each other with a UV-curable sealing member 3 interposed between the substrates, the UV-curable sealing member 3 being mixed with spacers 4. The UV-curable sealing member 3 includes a UV-curable resin and high-refractive members each having a refractive index higher than that of the UV-curable resin, the high-refractive members being dispersed into the UV-curable resin. In the first exemplary embodiment, the high-refractive members are high-refractive layers 5 formed respectively on the surfaces of the spacers 4. The high-refractive layer 5 is configured of any one of DLC (diamond-like carbon: amorphous carbon), zirconia, titanium oxide and alumina.

Furthermore, in the LCD device 1, a liquid crystal layer 21 is interposed between the TFT substrate 2a and the counter substrate 2b. One of alignment films 22 is formed in the display region 20 of the TFT substrate 2a of the LCD device 1. A color filter layer 23 and a black matrix layer 6 are formed on the counter substrate 2b, and another alignment film 22 is formed on the color filter layer 23 and the black matrix layer 6 in the display region 20.

Figure 2:
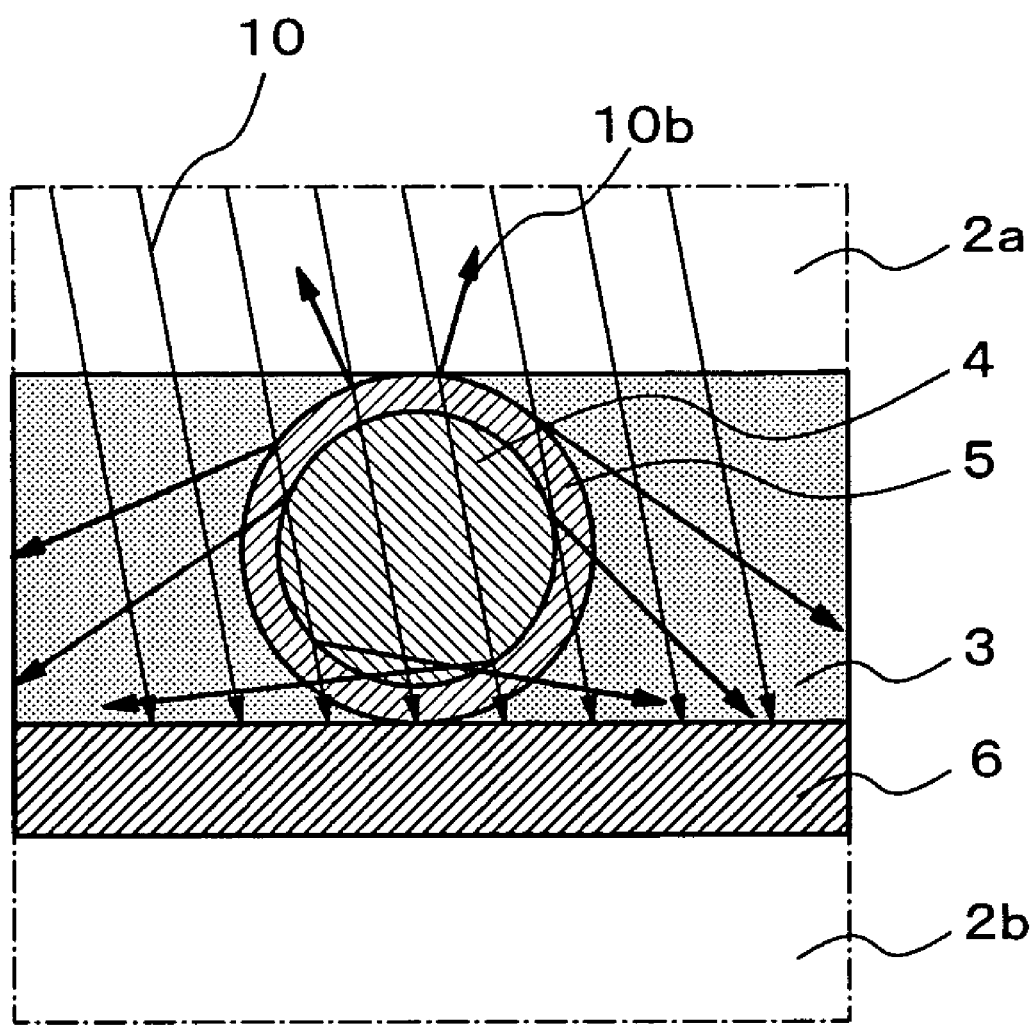
FIG. 2 is an enlarged cross-sectional view showing a portion A of FIG. 1.

The LCD device 1 will be described again, as illustrated in FIG. 1, the LCD device 1 has a structure in which the TFT substrate 2a and the counter substrate 2b are joined to each other with the UV-curable sealing member interposed in between. The TFT substrate 2a has drive pixels each having a TFT switching element (not illustrated) at least in the display region 20. On the surface of the TFT substrate 2a being in contact with the sealing member 3, metal wirings for driving TFT switching elements are arbitrarily formed. In addition to the wirings, gaps are also formed so that UV rays can sufficiently penetrate the substrate and that UV rays are not prevented from being made incident on the sealing member. On the counter substrate. 2b,the black matrix layer 6 is formed as a base of the sealing member, and the color filter layer 23 is formed in a portion corresponding to the display region 20. The counter substrate 2b does not necessarily have an RGB color layer, and may be a substrate for black and white display. Spacers 4 for determining the cell gap are dispersed in the sealing member 3. Each of the spacers 4 may be spherical or shaped like a rod. The outer periphery of each of the spacers 4 is configured of the high-refractive layer 5. The high-refractive layer 5 at least has a refractive index larger than that of the base resin constituting the sealing member 3. In FIG. 1, each of the spacers 4 has a configuration in which the spacer 4 is coated with the single-layered high-refractive layer 5. However, each of the spacers 4 may have a high-refractive index. Alternatively, each of the spacers 4 may have a configuration in which the spacer 4 is coated with a multi-layered high-refractive layer 5. In other words, the refractive layers 5 configured of stacked layers may be formed on the surface of each of the spacers 4. It suffices that each of the spacers 4 has a configuration in which UV rays 10 are substantially reflected on the outer periphery of the spacer 4. FIG. 1 shows a state where the UV rays 10 are made incident on the TFT substrate 2a, and are partly reflected on the high-refractive layers 5 formed on the spacers 4 so that the UV rays 10 are scattered toward the side surface of the sealing member 3. As illustrated in FIG. 2, the UV rays 10 made incident on the upper TFT substrate 2a are partly scattered toward the side surface of the sealing member 3 or the like as reflected rays 10b in the interfaces each between the high-refractive film 5 and the sealing member 3 depending on the refractive indices of the high-refractive film 5 and the sealing member 3.

In the first exemplary embodiment, the sealing member 3 has a width of 1.8 mm, each of the spacers 4 has a thickness of 4.0 μm, the TFT substrate 2a has a thickness of 0.7 mm, and the counter substrate 2b has a thickness of 0.7 mm. On the surface of the counter substrate 2b, which is in contact with the seal pattern, the black matrix layer 6 obtained by dispersing carbon black in resin is formed. The outer periphery of each of the spacers 4 is coated with the high-refractive layer 5 having a thickness of 10 nm. The spacers 4 each being spherical are dispersed in the sealing member 3 so that the dispersion ratio of the spacers 4 to the sealing member 3 is 1 wt %. The base resin and oligomer being respectively acrylic and acrylic modified epoxy are used for the sealing member 3 before the sealing member 3 is cured. The sealing member 3 contains 10 wt % silica fillers for adjusting viscosity of the sealing member 3. Silica beads are used as core members of the spacers 4, and the outer periphery of each of the spacers 4 is coated with DLC. The coat of DLC can be easily formed by plasma-enhanced CVD (Chemical Vapor Deposition) or the like.

Figure 3:
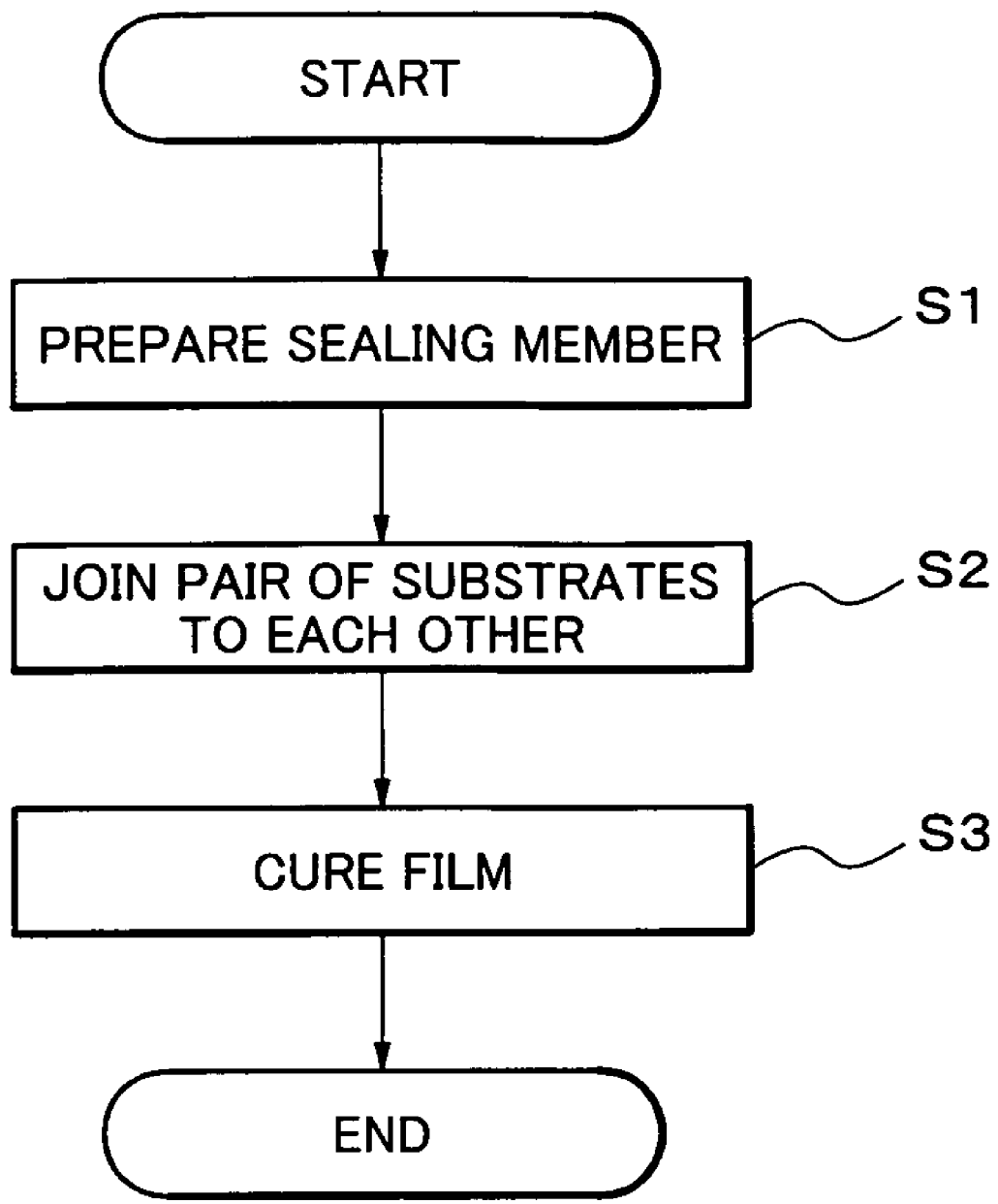
FIG. 3 is a flow chart for describing a method of manufacturing the LCD device of the invention.

Moreover, the method of manufacturing an LCD device of the embodiment is to join the TFT substrate 2a and the counter substrate 2b, which are an example of a pair of substrates, to each other with the UV-curable sealing member 3 mixed with the spacers 4. As shown in FIG. 3, the method includes the following three steps: preparing the sealing member 3 by mixing, with the UV-curable resin, the spacers 4 and the high-refractive members each having a refractive index higher than that of the UV-curable resin (Step S1); joining the TFT substrate 2a and the counter substrate 2b to each other with the sealing member 3 interposed in between (Step S2); and curing the sealing member 3 with the UV rays 10 (Step S3). In the embodiment, the high-refractive members are the high-refractive layers 5 formed respectively on the surfaces of spacers 4. The refractive layers 5 are configured of any one of DLC (Diamond-like carbon), zirconia, titanium oxide and alumina.

In the step of curing the sealing member by irradiating UV light on the film in the ODF process, liquid crystals are already filled in the liquid crystal layer 21. For this reason, the area on which UV rays are irradiated (hereinafter referred to as "UV irradiation area") shown in FIG. 1 is determined so that the liquid crystal layer 21 is not damaged, although the area is relatively larger than the width of the sealing member 3. In addition to the liquid crystal layer 21, it is necessary to protect the organic materials such as the alignment film 22 and the color filter layer 23 in the display region 20 from the UV rays. In the embodiment, the UV rays were blocked on the top of the substrate, which excludes the irradiation area, and on which UV rays are made incident (the TFT substrate in FIG. 1), with a metal mask (not illustrated).

Two radiation intensities of UV rays, after having passed through the TFT substrate, of 2000 mj/cm$^2$ and 2500 mj/cm$^2$ (metal halide lamp light source with a peak wavelength of 315 nm) were used as conditions of the sealing member curing process in the ODF process. The sealing members were cured with the above-described conditions, and then were cured at 120° C. for one hour With the metal mask, UV rays made incident on the top of the substrate are blocked in an area except the irradiation area including the sealing member and a portion which has a width of 0.5 mm. The distance from the portion and the display region is 0.5 mm.

The LCD devices each having the above-described configuration were prepared and observed. When each of the LCD devices prepared respectively with the conditions of UV irradiation were observed in the initial state by use of a polarization microscope, the alignment of liquid crystals near the seal pattern was excellent without domain change of liquid crystals and elution of the uncured substance from the sealing member. Furthermore, when the display quality was visually examined by lighting the LCD devices, visible defect and display unevenness due to alignment defect around the display region near the seal pattern did not occur. In addition, High temperature and High humid Bias Test (HHBT) (with the condition of temperature of 60° C. and humidity of 90%) was carried out for 240 hours to examine reliability of the LCD devices prepared respectively with the UV irradiation conditions. As a result, visible defect and display unevenness due to alignment defect occurred around the display region did not newly occur.

Other two types of LCD devices were prepared, each of which has spacers each having the core member formed of a silica bead as in the case of the above-described case. Zirconia is used to cover the outer periphery of each of the silica beads of the LCD device of one of the types, and alumina is used to cover the outer periphery of each of the silica beads of the LCD device of the other type. The liquid crystal devices were evaluated as in the procedures same as in the case of the above-described case. The result was that the LCD devices respectively including DLC, zirconia and alumina as the coats respectively having higher refractive indices in this order respectively had higher reliability in this order.

As an comparative example, LCD devices each having a configuration different from that of the above-described configuration were prepared respectively with the UV irradiation conditions of 2000 mj/cm$^2$ and 2500 mj/cm$^2$, and then were evaluated as in the above-described case. Each of the LCD devices of the comparative example had no coating member on the outer periphery of a silica bead of each spacer. When the crystal display device prepared with the UV irradiation condition of 2000 mj/cm$^2$ in the initial state was observed by use of a polarization microscope, domain change and elution of the uncured substance from a seal pattern were observed with respect to the alignment state of the liquid crystals near a seal pattern. Furthermore, the display quality of the LCD device prepared with the UV irradiation condition of 2000 mj/cm$^2$ was visually examined by lighting the LCD device, visible defect and display unevenness due to alignment defect around the display region near the seal pattern occurred. In addition, HHBT (with the condition of temperature of 60° C. and humidity of 90%) was carried out for 240 hours to examine reliability of the LCD devices, and occurrence of visible defect and display unevenness due to alignment defect around the display region was observed, which gradually spread to the display region. Thereafter, by use of a polarization microscope, the intensity of UV rays causing no domain change of the alignment of liquid crystals near the seal pattern was confirmed with the liquid crystal devices, whose configuration was of the comparative example, in the initial state. As a result, the intensity was 2500 mj/cm$^2$. However, when HHBT (with the condition of temperature of 60° C. and humidity of 90%) was carried out for 240 hours on each of the liquid crystal devices to examine reliability thereof, occurrence of visible defect and display unevenness due to alignment defect around the display region 5 was observed in the display region although the visible defect and the display unevenness were little. Table 1 shows the results.

TABLE 1

| Spacer | Coating member | UV irradiation Intensity | Initial State | 240 hr |
|---|---|---|---|---|
| Silica | DLC | 2000 mj/cm$^2$ | ○ | ○ |
| Silica | DLC | 2500 mj/cm$^2$ | ○ | ○ |
| Silica | Zirconia | 2000 mj/cm$^2$ | ○ | Δ |
| Silica | Zirconia | 2500 mj/cm$^2$ | ○ | ○ |
| Silica | Alumina | 2000 mj/cm$^2$ | ○ | x |
| Silica | Alumina | 2500 mj/cm$^2$ | ○ | ○ |
| Silica | No | 2000 mj/cm$^2$ | Δ | x |
| Silica | No | 2500 mj/cm$^2$ | ○ | Δ |

○ No Problem
Δ Little Alignment Defect, Visible Defect and Display Unevenness
x Alignment Defect, Visible Defect and Display Unevenness It can be considered that the difference of results between the embodiment and the comparative example resulted from the following facts. The refractive indices of the embodiment and the comparative example at the interfaces each between the base resin of the sealing member and the outer periphery of each spacer are different from each other, and UV rays were significantly reflected on the interface in the embodiment in particular. In other words, it can be considered that the UV-curable sealing member 3 of the first exemplary embodiment was efficiently cured compared with that of the comparative example.

As described, when the sealing member 3 is cured with the UV rays 10 in the first exemplary embodiment, the UV rays 10 made incident on the sealing member 3 are partly reflected on the interface between the UV-curable resin of the sealing member 3 and the high-refractive layer 5, which has a refractive index higher than that of the UV-curable resin, and which is formed on the surface of each of the spacers 4. Thereafter, the UV rays 10 become the reflected rays 10b and then are scattered. The reflected rays 10b and the UV rays 10 made incident on the sealing member 3 permeate the sealing member 3. Accordingly, the curing reaction of the UV-curable sealing member 3 is sufficiently accelerated, and thus an LCD device can be realized which has a high quality without visible defect and display unevenness. In addition, such an LCD device with no visible defect and no display unevenness can be realized without providing a reflective layer as a base of the sealing member.

Although the descriptions have been provided for the acrylic base resin of the sealing member 3 in the first exemplary embodiment, the base resin may be epoxy or made of a different material. The descriptions have been provided for the spacers 4 formed of a material obtained by coating silica with DLC (with refractive index of approximately 2.3 to 2.4) in the first exemplary embodiment. However, titanium oxide (with refractive index of approximately 2.4) or zirconia (with refractive index of approximately 2.5) may be used in place of DLC. Alternatively, alumina (with refractive index of approximately 1.7) may be used although the reflectance thereof is slightly inferior to those of DLC and alumina due to the difference in refractive index.

Second Embodiment

Figure 4:
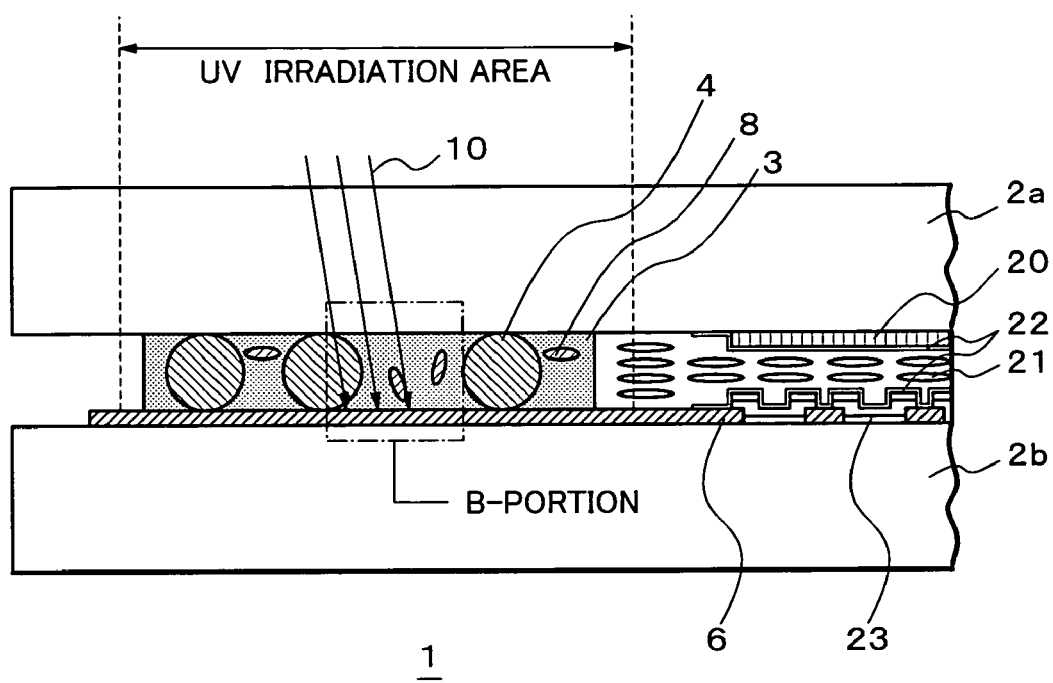
FIG. 4 is a partial cross-sectional view for describing an LCD device of a second exemplary embodiment of the invention.

As illustrated in FIG. 4, in an LCD device 1 of a second exemplary embodiment, a TFT substrate 2a and a counter substrate 2b, which are an example of a pair of substrates, are joined to each other with a UV-curable sealing member 3 interposed between the substrates, the UV-curable sealing member 3 being mixed with spacers 4. The sealing member 3 includes a UV-curable resin and high-refractive members which are dispersed in the UV-curable resin, and each of which has a refractive index higher than that of the UV-curable resin. In the embodiment, the high-refractive members are high-refractive fillers 8 dispersed in the UV-curable resin. The high-refractive fillers 8 are configured of any one of DLC (diamond-like carbon: amorphous carbon), zirconia, titanium oxide or alumina.

Furthermore, in the LCD device 1, a liquid crystal layer 21 is sandwiched between the TFT substrate 2a and the counter substrate 2b as in the case of the first exemplary embodiment. One of alignment films 22 is formed in a display region 20 of the TFT substrate 2a of the LCD device 1. A color filter layer 23 and a black matrix layer 6 are formed on the counter substrate 2b, and another alignment film 22 is formed on the color filter layer 23 and the black matrix layer 6 in the display region 20.

Figure 5:
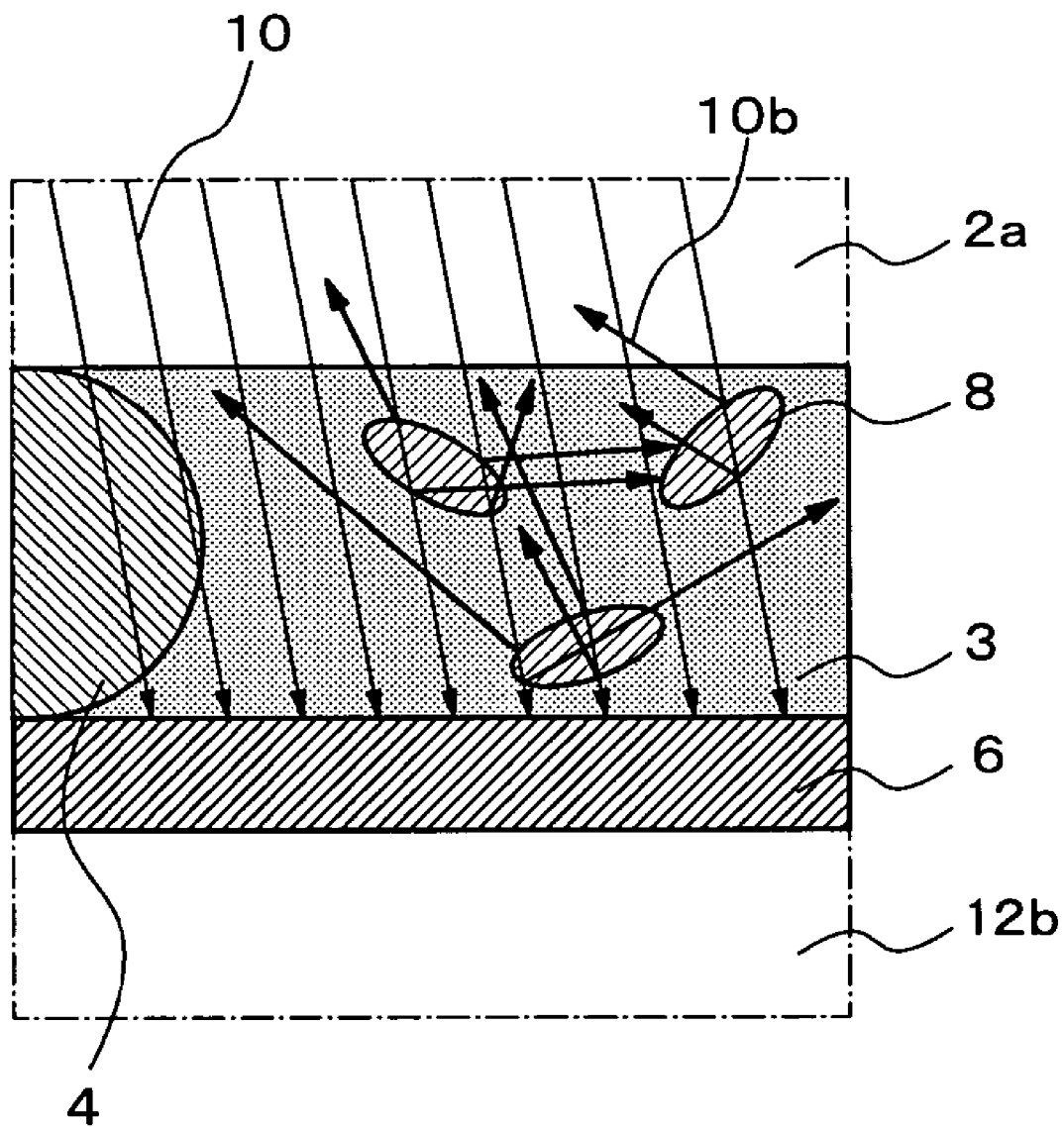
FIG. 5 is a enlarged cross-sectional view showing a portion B of FIG. 4.

The LCD device 1 will be specifically described again. As illustrated in FIG. 4, the LCD device 1 has a structure in which the TFT substrate 2a and the counter substrate 2b are joined to each other with the UV-curable sealing member 3 interposed in between. The TFT substrate 2a has drive pixels each having a TFT switching element (not illustrated) at least in a display region 20. On the surface of the TFT substrate 2a being in contact with the sealing member 3, metal wirings (not illustrated) for driving TFT switching elements are arbitrarily formed. In addition to the wirings, gaps are also formed so that UV rays can sufficiently penetrate the substrate and that UV rays are not prevented from being made incident on the sealing member. On the counter substrate 2b, the black matrix layer 6 is formed as the base of the sealing member 3, and the color filter layer 23 is formed in a portion corresponding to the display region 20. The counter substrate 2b is not necessarily has an RGB color layer, and may be a substrate for black and white display. The spacers 4, which determine the cell gap, and high-refractive fillers 8 are dispersed in the sealing member 3. Each of the spacers 4 may be spherical or shaped like a rod. Each of the high-refractive fillers 8 may have a spherical shape, a flake-like shape or a debris-like indefinite shape. At least the outer periphery of each of the high-refractive fillers 8 has a refractive index larger than that of a base resin constituting the sealing member 3. In FIG. 4, each of the high-refractive fillers 8 has a configuration in which a particle of the filler 8 itself has a higher refractive index. However, at least the outer periphery of each of the high-refractive fillers 8 may have a higher reflective index. Alternatively, each of the high-refractive fillers 8 may have a configuration in which the high-refractive filler 8 includes multiple layers, in other words, may have a stacked layered structure. It suffices that the high-refractive fillers 8 have a configuration in which UV rays made incident are substantially reflected on the outer peripheries of the high-refractive fillers 8. FIG. 4 shows a state where UV rays 10 are made incident on the TFT substrate 2a, and are partly reflected on the high-refractive fillers 8 so that the UV rays 10 are scattered toward the side surface of the sealing member 3. On the other hand, in a case where the difference of refractive indices between the sealing member 3 and each of the spacers 4 is smaller, the UV rays 10 made incident are not reflected on the interfaces between the sealing members 3 and the spacers 4, and pass substantially straight. As illustrated in FIG. 5, the UV rays 10 made incident on the upper TFT substrate 2a are partly scattered toward the side surface of the sealing member 3 as reflected rays 10b at the interfaces between the high-refractive fillers 8 and the sealing member 3 depending on the difference between refractive indices of materials of the high-refractive fillers 8 and the sealing member 3.

In the second exemplary embodiment, the sealing member 3 has a width of 1.8 mm, each of the spacers 4 has a thickness of 4.0 μm, each of the fillers 8 has a diameter of not more than 1.0 μm, the TFT substrate 2a has a thickness of 0.7 mm, and the counter substrate 2b has a thickness of 0.7 mm. On the surface of the counter substrate 2b which is in contact with a seal pattern, the black matrix layer 6 obtained by dispersing carbon black in resin is formed. The high-refractive fillers 8 are spheres made of zirconia, and are dispersed in the sealing member 3 so that the dispersion ratio to the sealing member 3 is 10 wt %. The base resin and oligomer being respectively acrylic and acrylic modified epoxy are used for the sealing member 3 before the sealing member 3 is cured.

The method of manufacturing an LCD device of the second exemplary embodiment is to join the TFT substrate 2a and the counter substrate 2b to each other with the UV-curable sealing member 3 mixed with the spacers 4, the substrates being as an example of a pair of substrates. As shown in FIG. 3, the method includes the three steps: preparing the sealing member 3 by mixing, into the UV-curable resin, the spacers 4 and the high-refractive members each having a refractive index higher than that of the UV-curable resin (Step S1), joining the TFT substrate 2a and the counter substrate 2b to each other with the sealing member 3 interposed in between (Step S2), and curing the sealing member 3 with the UV rays 10 (Step S3). In the embodiment, the high-refractive members are high-refractive fillers 8. The high-refractive fillers 8 are made of any one of DLC (Diamond-like carbon: amorphous carbon), zirconia, titanium oxide and alumina.

In the step of curing the sealing member 3 by irradiating UV rays on the sealing member 3 in the ODF process, liquid crystals are already filled in the liquid crystal layer 21. For this reason, an area on which UV rays are irradiated (hereinafter referred to as "irradiation area") shown in FIG. 4 is determined so that the liquid crystal layer 21 is not damaged, although the irradiation area is relatively larger than the width of the sealing member 3. In addition to the liquid crystal layer 21, it is necessary to protect, from UV rays, other organic materials such as the alignment film 22 and the color filter layer 23 in the display region 20. In the embodiment, UV rays are blocked on the top of the substrate, which excludes the irradiation area, and on which UV rays are made incident (the TFT substrate in FIG. 4) with a metal mask (not illustrated).

A radiation intensity of UV rays of 2000 mj/cm$^2$ (metal halide lamp light source with a peak wavelength of 315 nm) was used as a condition of the sealing member curing process in the ODF process. The sealing member was cured with the UV rays passing through the TFT substrate with the above-described condition, and then cured at 120° C. for one hour. With the metal mask, UV rays made incident on the top of the substrate are blocked in an area except the irradiation area including the sealing member and a portion which has a width of 0.5 mm. The distance from the portion and the display region is 0.5 mm.

An LCD device prepared with the above-described configuration was observed. When the crystal display device in the initial state was observed by use of a polarization microscope, the state of the alignment of liquid crystals near the film pattern was without domain change of liquid crystals and elution of the uncured substance from the sealing member. Furthermore, when the display quality was visually examined by lighting the LCD device, visible defect and display unevenness due to alignment defect around the display region near the seal pattern did not occur. In addition, HHBT (with the condition of temperature of 60° C. and humidity of 90%) was carried out for 240 hours to examine reliability of the LCD device, and visible defect and display unevenness due to alignment defect around the display region did not newly occur.

As another aspect of the embodiment, LCD devices each including high-refractive fillers, which respectively have debris-like indefinite shapes, and which are made of alumina, were prepared, and were evaluated. In each of the devices, the high-refractive fillers are dispersed in a sealing member at a dispersion ratio of 10 wt % to the sealing member. A base resin and oligomer, which were used for the sealing member 3, were respectively acrylic and acrylic modified epoxy, before the sealing member 3 was cured. Two radiation intensities of UV rays, after having passed through the TFT substrate, of 2000 mj/cm$^2$ and 2500 mj/cm$^2$ (metal halide lamp light source with a peak wavelength of 315 nm) were used as conditions of the sealing member curing process in the ODF process. The sealing members were cured with the above-described conditions, and then were cured at 120° C. for one hour. In each of the LCD devices, with the metal mask, UV rays were blocked on the top of the substrate, on which UV rays are made incident, except the irradiation area, the top including a portion corresponding to the display region with a width of 0.5 mm. The distance from the position where UV rays are applied to the display region is 0.5 mm.

The prepared LCD devices each having the above-described configuration were observed. When each of the crystal display devices in the initial state was observed by use of a polarization microscope, the state of the alignment of liquid crystals near the seal pattern was without domain change of liquid crystals and elution of the uncured substance from the sealing member. Furthermore, when the display quality of the LCD devices was visually examined by lighting the LCD devices, visible defect and display unevenness due to alignment defect around the display region near the seal pattern did not occur. Furthermore, HHBT (with the condition of temperature of 60° C. and humidity of 90%) was carried out for 240 hours on each of the LCD devices to examine reliability thereof. In the LCD device prepared with the condition of 2000 mj/cm$^2$, the occurrence of visible defect and display unevenness due to alignment defect in the display region was observed although the visible defect and the display unevenness were little. On the other hand, in the LCD device prepared with the condition of 2500 mj/cm$^2$, visible defect and display unevenness due to alignment defect in the display region did not occur.

The difference in reliability resulted from the difference between zirconia and alumina used as materials of fillers, and from the irradiation intensities. It can be considered that the difference is caused because zirconia has a refractive index higher than that of the alumina, and that thus UV rays are slightly more efficiently used with zirconia.

As an comparative example to the above-described configuration, an LCD devices each configured to include silica fillers in place of the high-refractive fillers were prepared respectively with the same conditions described above, and were evaluated as in the above-described embodiments. When the crystal display device prepared with the condition of 2000 mj/cm$^2$ in the initial state was observed by use of a polarization microscope, domain change occurred near a seal pattern with respect to the alignment of liquid crystals, and elution of an uncured substance from a film was observed. Furthermore, the display quality of the LCD device prepared with the condition of 2000 mj/cm$^2$ was visually examined by lighting the LCD device, and visible defect and display unevenness due to alignment defect around a display region near a film pattern occurred. In addition, HHBT (with the condition of temperature of 60° C. and humidity of 90%) was carried out for 240 hours on each of the liquid display devices to examine reliability thereof. Then, occurrence of visible defect and display unevenness due to alignment defect around the display region, which gradually spread to a display region, was observed in both of the LCD devices. Thereafter, the UV irradiation intensity causing no domain change of the alignment of liquid crystals near the seal pattern was confirmed by use of a polarization microscope, in the configuration of the comparative example. The UV irradiation intensity was 2500 mj/cm$^2$. However, when HHBT (with the condition of temperature of 60° C. and humidity of 90%) was carried out for 240 hours on the LCD device prepared with the condition of 2500 mj/cm$^2$ to examine the reliability thereof, occurrence of visible defect and display unevenness due to alignment defect around the display region was observed in the display region although the visible defect and display unevenness was little. Table 2 shows the results.

TABLE 2

| Spacer | Filler | UV irradiation Intensity | Initial State | 240 hr |
|---|---|---|---|---|
| Silica | Zirconia | 2000 mj/cm$^2$ | ○ | ○ |
| Silica | Alumina | 2000 mj/cm$^2$ | ○ | Δ |
| Silica | Alumina | 2500 mj/cm$^2$ | ○ | ○ |
| Silica | Silica | 2000 mj/cm$^2$ | Δ | x |
| Silica | Silica | 2500 mj/cm$^2$ | ○ | Δ |

○ No Problem
Δ Little Alignment Defect, Visible defect and Display Unevenness
x Alignment Defect, Visible defect and Display Unevenness It can be considered that the difference in results between the second exemplary embodiment and the comparative example is cased because the interface between the high-refractive filler and the base resin of the sealing member in the second exemplary embodiment has a refractive index different from that of the comparative example, and because UV rays are significantly reflected in the interface in the second exemplary embodiment in particular. In other words, it can be considered that the UV-curable sealing member 3 of the second exemplary embodiment is efficiently cured compared with that of the comparative example.

As described, when the sealing member 3 is cured with the UV rays 10 in the second exemplary embodiment, the UV rays 10 made incident on the sealing member 3 are partly reflected on the interface between the UV-curable resin of the sealing member 3 and each of the high-refractive fillers 8 which are dispersed in the UV-curable resin, and each of which has a refractive index higher than that of the UV-curable resin. Thereafter, the UV rays 10 become the reflected UV rays 10b and then are scattered. The reflected rays 10b, and the UV rays 10 made incident on the sealing member 3 permeate the sealing member 3. Accordingly, the curing reaction of the UV-curable sealing member 3 is sufficiently accelerated, and thus an LCD device can be realized which has a high quality without visible defect and display unevenness. In addition, such a crystal display device including no visible defect and no display unevenness can be realized without providing a reflective layer as a base of the sealing member.

Although the descriptions have been provided for the acrylic base resin 3 in the embodiment, the base resin may be epoxy or a different material. The descriptions have been provided for the high-refractive fillers 8 made of a material such as zirconia (with a refractive index of approximately 2.1) or alumina (with a refractive index of approximately 1.7) in the embodiment. However, titanium oxide (with a refractive index of approximately 2.4) or DLC (with a refractive index of approximately 2.3 to 2.4) may be also used for the fillers 8.

Although the preferable embodiments have been described, the invention is not limited to the embodiments, and various changes and additions can be made. In the above-described embodiments, descriptions have been provided for the UV-curable sealing member. However, the invention can also be applied to an LCD device and a method of manufacturing the device in each of which a sealing member is cured by means of both of UV rays and heat.

In addition, by selecting materials each having a higher relative permittivity for the spacers and the fillers which are used in the invention, the spacers and the fillers can exert performances for curing the sealing member equivalent to a high-refractive material. In other words, the performance can be realized by a sealing member including a UV-curable resin and members, which are dispersed in the UV-curable resin, and each of which has a relative permittivity higher than that of the UV-curable resin. The members each having the higher permittivity are fillers each having a higher relative permittivity or layers each formed on spacers each having a higher permittivity.

In the invention, an LCD device used especially as an OA monitor or a TV monitor has the configuration in which fillers or spacers, which are dispersed in the sealing member, appropriately reflect light. The reflection is for accelerating the curing reaction of the sealing member in the step of curing a sealing member with UV rays, and for enhancing the efficiency of using energy of UV rays absorbed in the sealing member. At the same time, liquid crystals and alignment films are prevented from being deteriorated or dissolving in a display region due to UV rays leaked and entering the display region. In addition, deterioration of display quality is prevented from occurring after parts of the LCD device are assembled, the deterioration resulting from components uncured in the sealing member dissolving into the display region. With the configuration describe above, it is possible to provide an LCD device, which has higher quality without visible defect and display unevenness, and which is manufactured at lower cost.

In addition, since UV rays can be efficiently reflected at the interfaces between a sealing member and each of the spacers or the fillers in the sealing member, the sealing member curing process for curing the sealing member can be efficiently and evenly carried out without provision of a reflective layer serving as a base of the sealing member. Accordingly, reliability in adhesion of the sealing member can be enhanced, components uncured and impurities resulting in alignment defect are prevented from oozing, and liquid crystal cells are prevented from being damaged to the maximum extent. In addition, it is not necessary to provide a special reflective layer to the substrate to enhance the reflection of UV rays, and accordingly, the LCD device can be manufactured at a lower cost.

The invention is especially suitable for an LCD device manufactured by the ODF process.

Although preferred embodiments of the invention has been described with reference to the drawings, it will be obvious to those skilled in the art that various changes or modifications may be made without departing from the true scope of the invention.

What is claimed is:

1. A liquid crystal display device comprising:
a pair of substrates between which liquid crystals are sandwiched;
an ultraviolet-curable sealing member for joining the pair of substrates to each other, the sealing member being obtained by dispersing, in an ultraviolet-curable resin, high-refractive members each having a refractive index higher than that of the ultraviolet-curable resin; and
spacers mixed into the sealing member,
wherein the high-refractive members has a transparent characteristic such that UV ray made incident on the sealing member is partly reflected on the high-refractive members or is partly scattered in the interfaces between the high-refractive members and the sealing member depending on the refractive indices of the high-refractive members and the sealing member.

2. The liquid crystal display device as recited in claim 1, wherein the high-refractive members are high-refractive layers respectively formed on the surfaces of the spacers.

3. The liquid crystal display device as recited in claim 2, wherein the high-refractive members are made of any one of diamond-like carbon, zirconia, titanium oxide and alumina.

4. The liquid crystal display device as recited in claim 3, wherein each of the high-refractive members has a refractive index of not less than 1.7.

5. The liquid crystal display device as recited in claim 3, wherein each of the high-refractive members has a refractive index of not less than 2.1.

6. The liquid crystal display device as recited in claim 1, wherein each of the high-refractive members has a stacked structure of layers which are formed on the surface of each of the spacers, and the outermost layer thereof is a high-refractive layer whose refractive index is higher than that of the ultraviolet-curable resin.

7. The liquid crystal display device as recited in claim 1, wherein each of the high-refractive members has a stacked structure of high-refractive layers which are formed on the surface of each of the spacers, and a refractive index of the outermost layer is higher than that of any other layer in the stacked structure of high-refractive layers.

8. The liquid crystal display device as recited in claim 1, wherein the high-refractive members are high-refractive fillers dispersed in the ultraviolet-curable resin.

9. The liquid crystal display device as recited in claim 8, wherein the high-refractive members are made of any one of diamond-like carbon, zirconia, titanium oxide and alumina.

10. The liquid crystal display device as recited in claim 9, wherein each of the high-refractive members has a refractive index of not less than 1.7.

11. The liquid crystal display device as recited in claim 9, wherein each of the high-refractive members has a refractive index of not less than 2.1.

12. The liquid crystal display device as recited in claim 1, wherein the high-refractive members are high-refractive fillers, which are dispersed in the ultraviolet-curable resin, each of the high-refractive fillers having a stacked structure of layers, and the outermost layer of each of the fillers having a refractive index higher than that of the ultraviolet-curable resin.

13. The liquid crystal display device as recited in claim 1, wherein the high-refractive members are high-refractive fillers, which are dispersed in the ultraviolet-curable resin, each of the high-refractive fillers having a stacked structure of layers, and a refractive index of the outermost layer being higher than that of any other layer in the stacked structure of layers.

14. A liquid crystal display device comprising:
a pair of substrates between which liquid crystals are sandwiched;
an ultraviolet-curable sealing member for joining the pair of substrates, the ultraviolet-curable sealing member being obtained by dispersing, in an ultraviolet-curable resin, high-relative-permittivity members each having a relative permittivity higher than that of the ultraviolet-curable resin; and spacers mixed into the sealing member, wherein the high-relative-permittivity members has a transparent characteristic such that UV ray made incident on the sealing member is partly reflected on the high-relative-permittivity members or is partly scattered in the interfaces between the high-relative-permittivity members and the sealing member depending on the relative permittivities of the high-relative-permittivity members and the sealing member.

15. The liquid crystal display device as recited in claim 14, wherein the high-relative-permittivity members are high-relative-permittivity fillers dispersed in the UV-curable resin.

16. The liquid crystal display device as recited in claim 14, wherein the high-relative-permittivity members are high-relative-permittivity layers respectively formed on the surfaces of the spacers.

17. A method of manufacturing a liquid crystal display device comprising the steps of:

preparing an ultraviolet-curable sealing member by mixing spacers and high-refractive members into an ultraviolet-curable resin, each of the high-refractive members having a refractive index higher than that of the ultraviolet-curable resin, the high-refractive members having a transparent characteristic such that UV ray made incident on the sealing member is partly reflected on the high-refractive members or is partly scattered in the interfaces between the high-refractive members and the sealing member depending on the refractive indices of the high-refractive members and the sealing member;

joining a pair of substrates to each other with the sealing member interposed in between; and curing the sealing member with ultraviolet rays.

18. The method of manufacturing a liquid crystal display device according to claim 17, wherein the high-refractive members are high-refractive layers respectively formed on the surfaces of the spacers.

19. The method of manufacturing a liquid crystal display device according to claim 18, wherein the high-refractive members are made of any one of diamond-like carbon, zirconia, titanium oxide and alumina.

20. The method of manufacturing a liquid crystal display device according to claim 19, wherein each of the high-refractive members has a refractive index of not less than 1.7.

21. The method of manufacturing a liquid crystal display device according to claim 19, wherein each of the high-refractive members has a refractive index of not less than 2.1.

22. The method of manufacturing a liquid crystal display device according to claim 17, wherein each of the high-refractive members has a stacked structure of layers which are formed on the surface of each of the spacers, and the outermost layer thereof is a high-refractive layer whose refractive index is higher than that of the ultraviolet-curable resin.

23. The method of manufacturing a liquid crystal display device according to claim 17, wherein each of the high-refractive members has a stacked structure of high-refractive layers which are formed on the surface of each of the spacers, and a refractive index of the outermost layer is higher than any other layer in the stacked structure of high-refractive layers.

24. The method of manufacturing a liquid crystal display device according to claim 17, wherein the high-refractive members are high-refractive fillers.

25. The method of manufacturing a liquid crystal display device according to claim 24, wherein the high-refractive members are made of any one of diamond-like carbon, zirconia, titanium oxide and alumina.

26. The method of manufacturing a liquid crystal display device according to claim 25, wherein each of the high-refractive members has a refractive index of not less than 1.7.

27. The method of manufacturing a liquid crystal display device according to claim 25, wherein each of the high-refractive members has a refractive index of not less than 2.1.

28. The method of manufacturing a liquid crystal display device according to claim 17, wherein the high-refractive members are high-refractive fillers each of which has a stacked structure of layers, and the outermost layer of each of the fillers has a refractive index higher than that of the ultraviolet-curable resin.

29. The method of manufacturing a liquid crystal display device according to claim 17, wherein the high-refractive members are high-refractive fillers each of which has a stacked structure of layers, and a refractive index of the outermost layer is higher than that of any other layer in the stacked structure of layers.

* * * * *